Nov. 22, 1955 W. A. GUSS 2,724,626
AXIAL LOCK FOR CHART BEARING
Filed Sept. 3, 1952
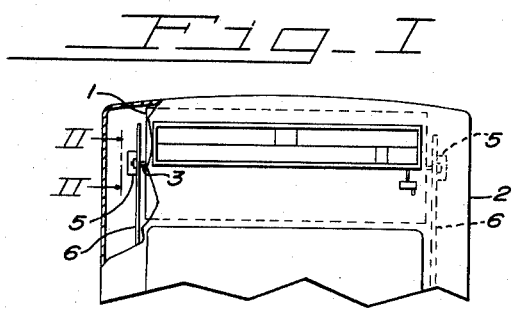
Fig. I
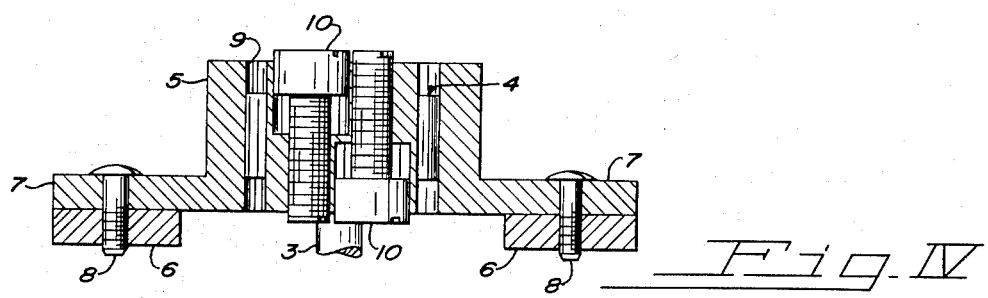
Fig. III
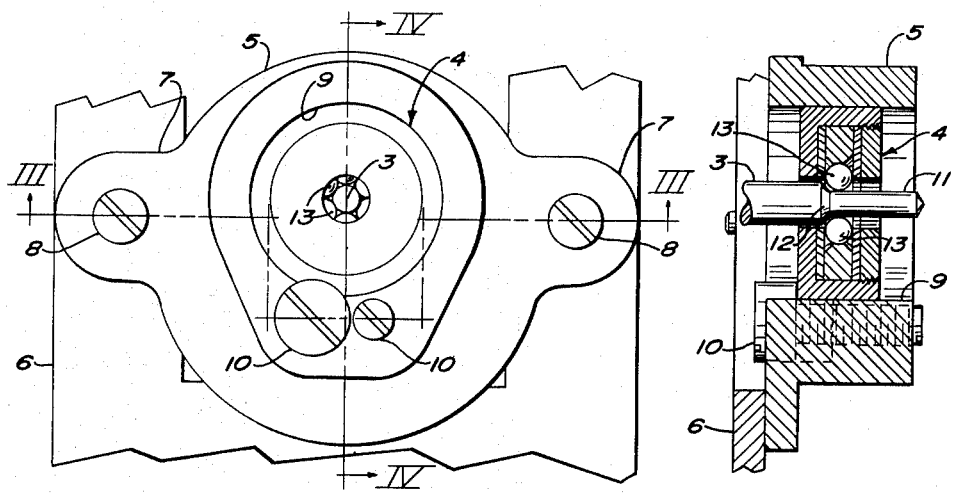
Fig. II  Fig. IV
INVENTOR.
WILLIAM A. GUSS
BY
Marshall, Marshall & Yeasting
ATTORNEYS ered Nov. 22, 1955

2,724,626

AXIAL LOCK FOR CHART BEARING

William A. Guss, Toledo, Ohio, assignor to Toledo Scale Company, Toledo, Ohio, a corporation of New Jersey Application September 3, 1952, Serial No. 307,586

7 Claims. (Cl. 308—236)

This invention relates to weighing scale chart bearings and in particular to means for adjusting and locking anti-friction bearings which rotatably support the chart at its ends.

It is necessary in a weighing scale of the type having a cylindrical chart with a plurality of columns of value indicia spaced therearound to provide means for adjusting the chart axially. In general, such a cylindrical chart has an axle or shaft which is rotatably supported at each end by an anti-friction bearing. The bearings are in turn supported on the framework of the scale. The adjustment and retention of the cylindrical charts of prior art devices along their axes generally necessitated making further adjustment which became misaligned during such adjustment and retention.

The principal object of the invention is to provide easily adjustable anti-friction bearings for the ends of a cylindrical chart shaft.

Another object of the invention is to provide retaining means for chart bearings.

A further object is to provide means for adjusting and retaining a bearing without destroying the centricity of the bearing.

Still another object is to provide bearings for the ends of a cylindrical chart shaft which bearings may be adjustable axially at the ends of the bearings remote from the chart.

Other objects and advantages will be apparent from the following description in which reference is made to the accompanying drawings and specification.

According to the invention a weighing scale of the type having a cylindrical chart mounted on a shaft is provided with upright portions of a weighing scale frame at each end of the chart, each of which portions support a bearing case mounted co-axially with the chart shaft. Each bearing case is provided with a central bore which receives an anti-friction bearing adapted to rotatably support the chart on its shaft. The bearings are axially adjustable in the bore to permit adjustment of the chart along its axis.

A pair of screws are threaded into each bearing case with their axes parallel to the axis of the bore and parallel to each other. The screws are threaded through the bearing case from opposite ends and are each provided with a shoulder which extends laterally inwardly of the bore. When the bearing is mounted in the bore, the shoulders of the screws are adapted to engage opposite ends of the bearing to permit the bearing to be axially adjusted and retained within the bore. Adjustment of the bearing at each end of the chart permits the chart itself to be axially adjusted.

The invention further provides that the screws in each bearing case be slotted on at least their ends extending away from the chart to permit accessibility to the screws for adjustment without removing the bearing case from the frame.

In the drawings:

Figure I is a fragmentary view of a weighing scale of the cylindrical chart type illustrating the general manner in which the chart may be supported on its shaft.

Figure II is an enlarged fragmentary view taken along line II—II of Figure I.

Figure III is a cross-sectional view taken substantially along the line III—III of Figure II.

Figure IV is a cross-sectional view taken substantially along line IV—IV of Figure II, illustrating the means by which a chart shaft is rotatably supported by a bearing.

These specific figures and the accompanying description are intended merely to illustrate the invention but not to limit its scope.

Referring to Figure I, a cylindrical chart 1 mounted within a weighing scale housing 2 is provided with an axle or shaft 3 which is rotatably supported at each end by an anti-friction bearing 4 mounted in a bearing case 5. The bearing cases 5 are positioned co-axially with the chart shaft 3 on upright portions 6 of the scale framework at each end of the chart 1. Since the instant invention concerns only the means for adjusting and supporting a chart, the weighing scale will be described only so far as is necessary to fully illustrate the invention.

The bearing case 5 at each end of the chart is mounted on the upright portion 6 of the weighing scale frame in any desired manner and is shown in Figure II as having two oppositely directed ears 7 adapted to receive screws 8 to facilitate fastening the bearing case 5 to the upright portion 6 of the frame.

Referring now to Figure III, the bearing case 5 has a central bore 9 in which the bearing 4 may be axially slidable. A pair of fillister head screws 10 are threaded from opposite directions through a portion of the bearing case 5 adjacent the bore 9 with their axes parallel to the bore. The heads of the screws 10 extend laterally inwardly of the bore so as to permit shoulders of the heads to engage portions of the opposite ends of the bearing 4. The screws 10 are closely spaced so that their shoulders which engage opposite ends of the bearing 4 are as directly opposite each other as possible. The diameter of the bearing 4 is in such a dimensional relation to the diameter of the bore 9 that the bearings may be axially slidable but not laterally movable in the bore. A substantially close fit is necessary between the bearing 4 and the bore 9 if the co-axial alignment of the two is to be maintained at all times. The length of the bearing 4 (i. e., the distance from end to end) should be such that tightening of the two screws 10 to lock the bearing in a selected portion of the bore will not cause the bearing to be cocked in the bore 9 so as to destroy the axial alignment of the bearing 4 with respect to the bore 9. Slots are provided at each end of each of the screws 10 to permit their being adjusted from either or both ends of the bearing case 5. This particular arrangement of slotting both ends of each screw facilitates manufacturing in that the screws are identical.

Referring now to Figure IV, the chart shaft 3 has a turned-down portion 11 with a conical shoulder 12 between the turned-down portion 11 and the main portion of the shaft 3 supporting the chart 1. Ball bearings 13 of the anti-friction bearing 4 are adapted to rotatably support the turned-down portion 11 of the shaft 3 at a point adjacent the conical shoulder 12. When the bearing 4 is properly adjusted with respect to the shaft 3, there should be a small degree of play between the conical shoulder 12 and the ball bearings 13. It should be understood that the shaft is identical at each end so that the play between the conical shoulders 12 and the ball bearings 13 will permit the shaft 3 and the chart 1 carried thereby to be rotatable with a minimum amount of friction.

Should it be necessary to adjust the chart axially, the bearing at the end of the chart toward which the chart is to be moved is adjusted outwardly away from the chart by manipulating the screws 10 cooperating with that bearing. The bearing at the opposite end of the chart is then adjusted toward the chart by manipulating its screws 10 in a like manner. It can be noticed that the provision of screws 10 which are slotted at both ends permits the bearings to be adjusted from the ends of the bearing cases remote from the chart. It can further be seen that such manipulation of the screws 10 in each bearing case does not destroy the centricity of the bearings since no radial pressure such as was common with most prior art devices is applied.

When the chart 1 has been correctly adjusted, the bearings 4 are then locked in their selected positions in the bores 9 by the engagement of the shoulder of the screws 10 with the ends of the bearings 4. In adjusted position, the bearings should be locked as shown in Figure IV with a small degree of play between the conical shoulders of the shaft 3 and the ball bearings 13 to minimize friction during rotation of the chart.

The embodiment of my invention herein shown and described is to be regarded as illustrative only and it is to be understood that the invention is susceptible to variation, modification, and change within the spirit and scope of the subjoined claims.

Having described the invention, I claim:

1. In a weighing scale having a rotatable cylindrical chart and an axle on which said chart is rotatable, in combination, a bearing for each end of the axle, a bearing case for each bearing, each case having a bore in which its bearing may be slidably adjusted, a frame member adjacent each end of the chart to support the bearing cases, and a pair of screws threaded into each bearing case with their axes parallel to each other and to the bore, the axes of the screws being spaced from each other, said screws being slotted at least on their ends remote from the chart and each screw having a portion thereof engaging its respective bearing whereby the bearing may be retained in a selected portion of the bore.

2. In a lock for a bearing, in combination, a bearing case having a bore therethrough, a bearing mounted in said bore, and a pair of spaced apart screws threaded into the bearing case, said pair of screws having their axes parallel to one another and to the axis of the bearing and adapted to engage opposite ends of the bearing to retain the bearing in a selected portion of the bore.

3. In a lock for a bearing, in combination, a bearing case having a bore therethrough, a bearing mounted in said bore, and a pair of spaced apart screws threaded into the bearing case, said pair of screws having their axes parallel to one another and to the axis of the bearing and having heads with shoulders thereof extending radially inwardly of the bore in the bearing case to engage opposite ends of the bearing to retain the bearing in a selected portion of the bore.

4. The combination set forth in claim 3 in which each end of each screw is slotted to adapt either or both of the screws to be turned from either end of the bearing case.

5. In a weighing scale having a rotatable cylindrical chart and an axle on which said chart is rotatable, in combination, a bearing for at least one end of the axle, a bearing case having a bore in which said bearing may be slidably adjusted, a frame member on which said bearing case is mounted, and a pair of spaced apart screws threaded into the bearing case, said pair of screws having their axes parallel to one another and to the axis of the bearing and adapted to engage opposite ends of the bearing to permit the bearing to be slidably adjusted in the bore and to retain the bearing in a selected portion of the bore.

6. In a weighing scale having a rotatable cylindrical chart and an axle on which said chart is rotatable, in combination, a bearing for at least one end of the axle, a bearing case having a bore in which said bearing may be slidably adjusted, a frame member on which said bearing case is mounted, and a pair of spaced apart screws threaded into the bearing case, said pair of screws having their axes parallel to one another and to the axis of the bearing and having heads with shoulders thereof extending radially inwardly of the bore in the bearing case to engage opposite ends of the bearing to permit the bearing to be slidably adjusted in the bore and to retain the bearing in a selected portion of the bore.

7. The combination set forth in claim 6 in which at least the outwardly directed end of each screw is slotted to facilitate adjustment of either or both of the screws from that end of the bearing case remote from the chart.

References Cited in the file of this patent

UNITED STATES PATENTS

| | | |
|---|---|---|
| 1,594,534 | Leister | Aug. 3, 1926 |
| 1,698,694 | Durdin | Jan. 8, 1929 |
| 1,837,601 | Wetzel | Dec. 22, 1931 |

FOREIGN PATENTS

| | | |
|---|---|---|
| 90,305 | Sweden | Sept. 21, 1937 |